United States Patent
Hoffmann

(10) Patent No.: US 6,844,715 B2
(45) Date of Patent: Jan. 18, 2005

(54) SYNTHETIC RF DETECTION SYSTEM AND METHOD

(75) Inventor: Shlomo Hoffmann, Randolph, NJ (US)

(73) Assignee: Honeywell International Inc., Morristown, NJ (US)

( * ) Notice: Subject to any disclaimer, the term of this patent is extended or adjusted under 35 U.S.C. 154(b) by 70 days.

(21) Appl. No.: 10/309,598

(22) Filed: Dec. 3, 2002

(65) Prior Publication Data

US 2004/0046541 A1 Mar. 11, 2004

Related U.S. Application Data

(60) Provisional application No. 60/407,982, filed on Sep. 5, 2002.

(51) Int. Cl.[7] .......................... G01D 1/16; G01R 13/02
(52) U.S. Cl. ................. 324/76.13; 324/76.14; 702/67
(58) Field of Search .................... 324/96, 76.13, 324/76.14, 76.45, 76.47, 76.55, 76.82; 455/188.1, 134; 327/347, 350; 702/66, 67, 70

(56) References Cited

U.S. PATENT DOCUMENTS

| | | | | |
|---|---|---|---|---|
| 3,581,217 A | * | 5/1971 | Isaacs | ........................ 327/102 |
| 3,588,836 A | | 6/1971 | Frazier, Jr. | |
| 4,255,706 A | * | 3/1981 | Soojian | ....................... 324/132 |
| 4,328,552 A | * | 5/1982 | Stovall | ........................ 702/111 |
| 4,758,793 A | * | 7/1988 | Sheade et al. | ............... 327/350 |
| 5,230,087 A | | 7/1993 | Meyer et al. | |
| 5,479,610 A | * | 12/1995 | Roll-Mecak et al. | .......... 714/25 |
| 5,656,929 A | * | 8/1997 | Humpherys | ................... 324/95 |
| 6,584,304 B1 | * | 6/2003 | Thomsen et al. | ......... 455/188.1 |

FOREIGN PATENT DOCUMENTS

| | | |
|---|---|---|
| DE | 197 45 391 A | 4/1998 |
| EP | 0 344 539 A | 12/1989 |
| EP | 0 913 703 A | 5/1999 |
| EP | 1 041 396 A | 10/2000 |

OTHER PUBLICATIONS

International Search Report; PCT/US 03/27824; Jan. 19, 2004.

* cited by examiner

*Primary Examiner*—Anjan K. Deb
(74) *Attorney, Agent, or Firm*—Kurt Luther; Lawrence Eisen

(57) ABSTRACT

Outputs of a linear RF detector and a logarithmic RF detector are multiplexed individually to a single digitizer or simultaneously to a respective digitizers. A process generates a composite waveform from the resulting digitized data, either at a later time in the former case or in real-time in the latter case. To achieve simultaneous routing, several routing relays are arranged in a specialized configuration between the outputs of the RF detectors and the inputs of the digitizers.

22 Claims, 4 Drawing Sheets

SYNTHETIC RF DETECTION SYSTEM AND METHOD

This application claims the benefit of U.S. Provisional Application No. 60/407,982, filed Sep. 5, 2002, which is herein incorporated by reference in its entirety.

BACKGROUND

1. Field of the Invention

The present invention is directed to radio frequency (RF) detection equipment arrangements and setups. More particularly, the present invention is directed to improved network analysis equipment configurations and methods for detecting pulsed RF signals.

2. Background of the Invention

In some types of RF testing there is sometimes a need to measure/detect a pulse-modulated RF signal with relatively high ON-OFF ratios, e.g., greater than 70 dB, with a high RF level at the ON state. One example of such testing, which is conducted by the assignee of the present invention, takes place in conjunction with a project known as RAH66, the designation given to the U.S. Department of Defense's Comanche helicopter project. Some RF testing in this case employs a Radio Frequency Portable Maintenance Aid Instrumentation Pack, or RF PIP. The RF PIP is used as a field, or "flight-line," test rig to test line replaceable units (LRUs) associated with different helicopter systems.

To achieve useful RF testing results, a logarithmic detector is typically employed to measure wide dynamic range signals. Currently available commercial off the shelf (COTS) devices that can be used in a Down Converter section of the aforementioned RF PIP have a dynamic range of no greater than 30 to 40 dB. However, this limited dynamic range is not sufficient for more sensitive testing/detecting that requires a full 70-dB instantaneous dynamic range, which is not uncommon on projects like RAH66.

There is, accordingly, a need in the art for an apparatus or equipment arrangement that can meet relatively wide dynamic range requirements, e.g., on the order of 70-dB.

SUMMARY OF THE INVENTION

The RF PIP employs two parallel down conversion line-ups with respective intermediate frequency (IF) signals being fed to independent parallel digitizers. Such a system enables simultaneous 2-channel processing. One of the RF PIP down converter line-ups includes a logarithmic radio frequency (RF) detector and a linear RF detector. With known or current equipment configurations only one of the detectors at a time can be routed via a switching circuit to a digitizer input. The present invention proposes to arrange the detectors and employ appropriate software techniques to effectively utilize both detectors simultaneously, thereby achieving the required 70 dB dynamic range.

More specifically, in a first approach or embodiment, the hardware configuration of the well-known RF PIP down converter remains the same when the primary goal is to measure a pulsed RF signal in a repetitive pulse train only. A software algorithm multiplexes each detector to a single digitizer, saves the results and then reconstructs the ON/OFF waveform.

In a second approach or embodiment, the conventional RF PIP down converter hardware configuration is modified to allow simultaneous routing of each detector into individual digitizers for parallel processing and reconstruction of the ON/OFF waveform. The modification includes rearranging the routing relays of the RF PIP such that simultaneous routing can be achieved. This method allows for measurement of s a single-shot or short pulsed RF signal with the aid of a trigger signal.

DETAILED DESCRIPTION OF THE INVENTION

A significant feature of the present invention is the ability to synthesize an RF detection function by simultaneously using the outputs of both a logarithmic and a linear detector and, along with appropriate software, reconstruct an original ON/OFF ratio of a detected pulsed RF signal. The linear detector is used for high sensitivity to detect RF leakage when the pulse is in the OFF state. In the ON state, the linear detector is saturated, and the software (which could also be implemented in hardware) ignores the linear detector's output. The logarithmic detector output, on the other hand, is used for detecting the ON state of the pulse. In the OFF state the logarithmic detector generates "noise" that is much higher in amplitude than the actual RF leakage and is ignored as well. Appropriate algorithms (implemented in software or hardware) reconstruct the true ON/OFF ratio in a synthetic manner by superimposing and combining the outputs of both detectors, either subsequent to the measurement or in real time.

There are two preferable hardware configurations to achieve the desired RF detection sensitivity.

In a first approach or embodiment, the hardware configuration of the well-known RF PIP down converter remains the same. A software algorithm multiplexes each detector to a single digitizer, saves the results and then reconstructs the ON/OFF waveform. This embodiment is discussed in detail with reference to FIG. 1.

In a second approach or embodiment, the conventional RF PIP down converter hardware configuration is modified to allow simultaneous routing of each detector into individual digitizers for parallel processing and reconstruction of the ON/OFF. This second embodiment is discussed in detail with reference to FIG. 2.

First Embodiment

Figure 1:
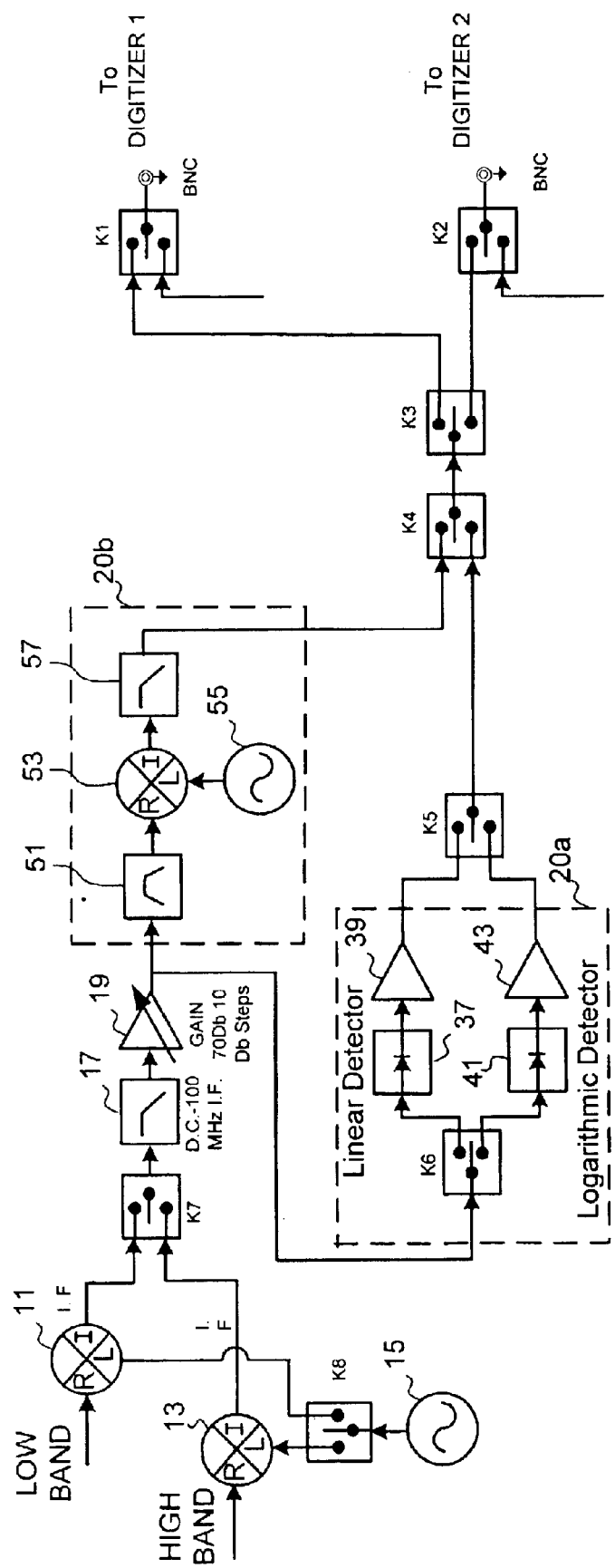
FIG. 1 illustrates a first embodiment of the present invention.

FIG. 1 illustrates a hardware configuration in accordance with a first embodiment of the present invention. As shown, mixers 11 and 13 receive low band and high band signals from a single input connector (not shown). The mixers are also fed a signal from source 15 (e.g., a local oscillator) via routing relay K8, which could also be a power divider or splitter. The resulting intermediate frequency signals output from mixers 11 or 13 are applied to routing relay K7, which preferably causes each of the outputted intermediate frequency signals to be multiplexed one at a time into a single digitizer (not shown) via routing relays K1 or K2 after passing through the additional circuitry, as described below After passing through routing relay K7 the selected signal is passed through low pass filter 17 and a high gain amplifier 19. The output of high gain amplifier 19 is split such that the signal is passed through two different sets of circuit components designated by broken line boxes 20a and 20b. In the first set of components 20a a relay K6 applies the signal to either linear detector 37 or logarithmic detector 41. The outputs of the detectors 37, 41 are passed through respective amplifiers 39 and 43, and then the signal is applied to routing relays K5 and K4 in succession.

Meanwhile, and in parallel, a portion of the split signal from high gain amplifier 19 is passed through components 20b. In this set of components a band pass filter 51 passes the signal that is output from high gain amplifier 19 to a mixer 53 that is fed from a signal generator 55. The output of mixer 53 is passed through a low pass filter 57, the output of which is applied to routing relay K4. Components 20b can be used for analysis where use of the separate linear and logarithmic detectors is not necessary.

The output of relay K4, which can be either the output of the first set of components 20a or the output of the second set of components 20b, is then applied to routing relay K3, which can be used to select which of the routing relays K1, K2 is to be used. Routing relays K1 and K2 determine which of the two digitizers (not shown) is to be used.

With the configuration of FIG. 1, either the linear detector 37 or the logarithmic detector 41 can be multiplexed via K5 to either digitizer.

Second Embodiment

Figure 2:
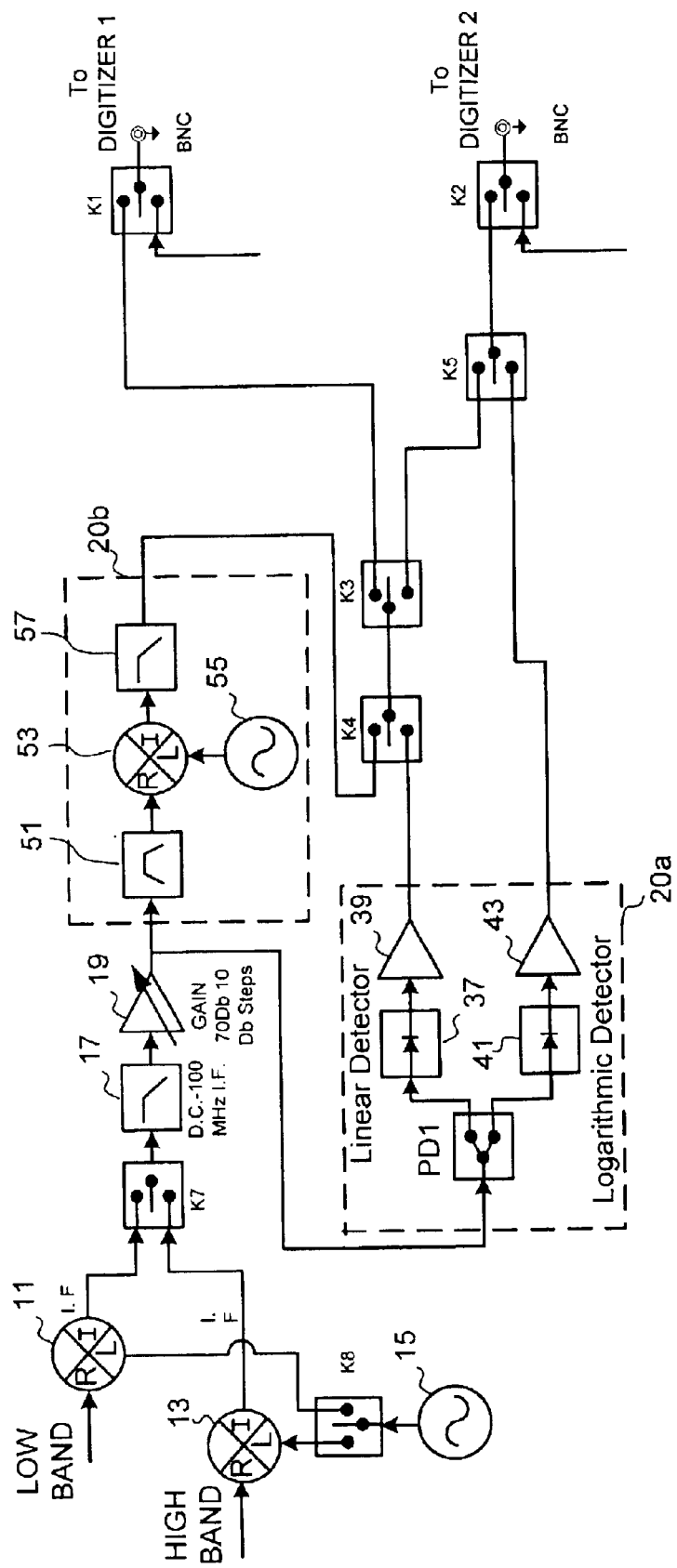
FIG. 2 illustrates a second embodiment of the present invention.

The configuration of the devices in the second embodiment is somewhat different from the first embodiment in that, as shown in FIG. 2, routing relay K5 is relocated to a position between routing relays K2 and K3. In accordance with this second embodiment it is possible to feed the outputs of both detectors 37 and 41 simultaneously to the inputs of independent digitizers that are connected to routing relays K1 and K2.

Figure 3:
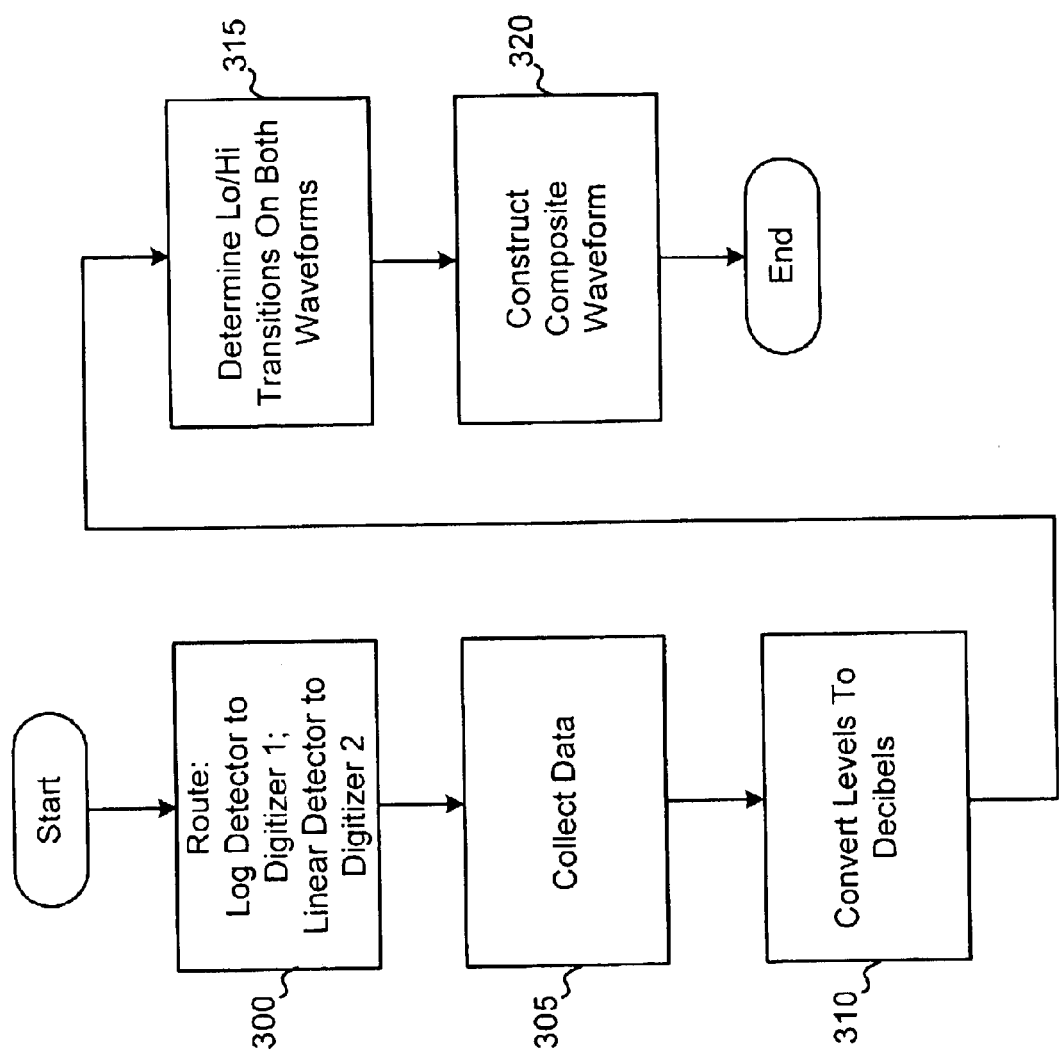
FIG. 3 depicts exemplary steps of a process for constructing a composite waveform in accordance with the present invention.

FIG. 3 depicts exemplary steps of a software algorithm, or process implemented in hardware, for implementing a synthesized RF detector by constructing a composite waveform in accordance with the present invention. In the first embodiment of the present invention, the process described below is performed after data from the linear and logarithmic detectors 37 and 41 has been digitized by the digitizers and recorded or stored. In the second embodiment, since both detectors can be monitored simultaneously by independent digitizers, the process shown in FIG. 3 can be performed in real time on the collected data.

In a preferred implementation, the process shown in FIG. 3 is performed on a general purpose or specialized computer system programmed to perform the described steps. Programming techniques to achieve the illustrated process steps is well-known in the art. The process begins at step 300 by routing linear and logarithmic detectors 37, 41 to respective digitizers. At step 305 data is collected. That is, the RF PIP is operated to detect the low and high band RF signal levels. At step 310 the detected signal levels are converted to Decibels using well-known transformation techniques. Then, at step 315, the low and high band transitions are determined for both waveforms. Finally, at step 320, a composite waveform is constructed and, if desired, displayed on a computer screen for a user to observe.

Figure 4:
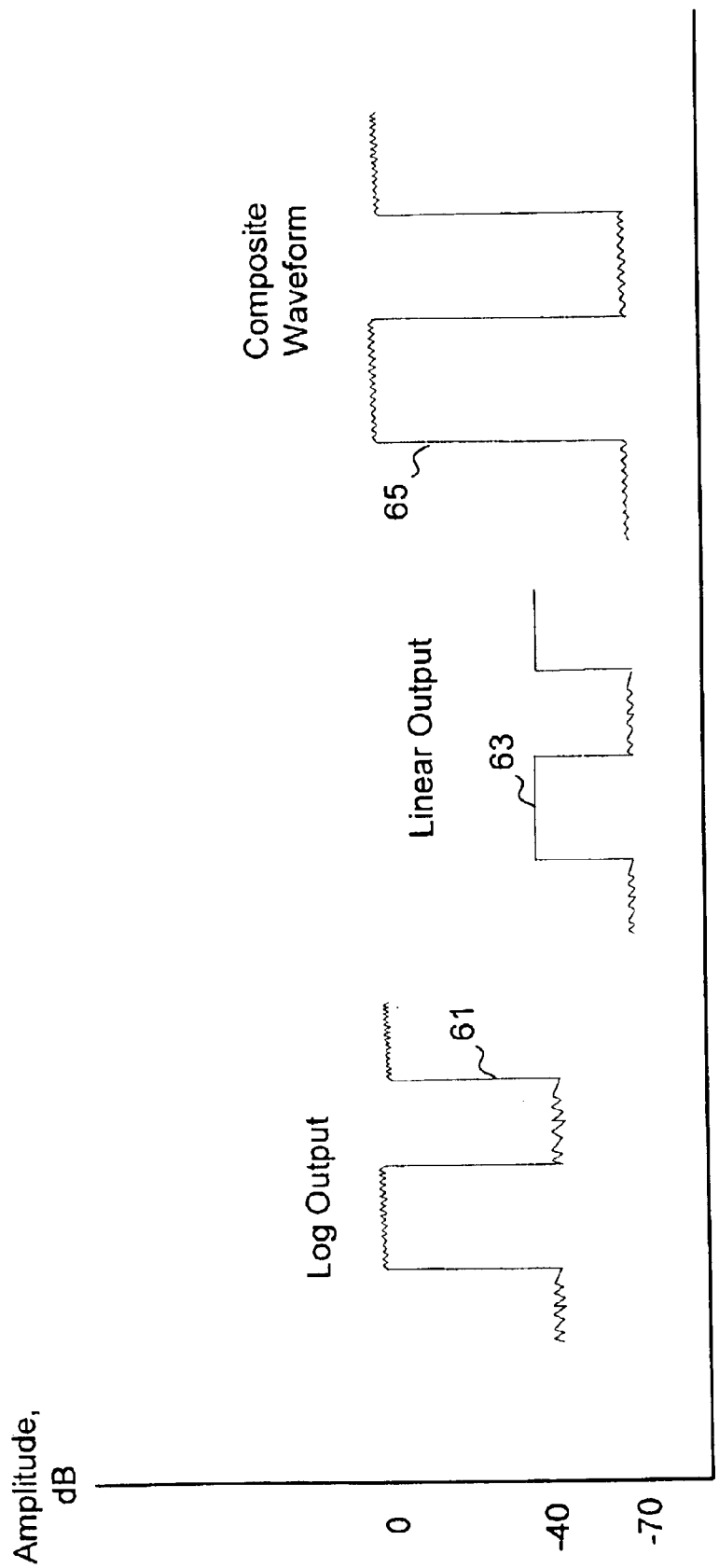
FIG. 4 shows exemplary output signals from a logarithmic detector, a linear detector, and a generated composite waveform after processing in accordance with the present invention.

FIG. 4 shows exemplary signals 61, 63, 65 that represent, respectively, an anticipated output from a logarithmic detector, an anticipated output from a linear detector, and a composite waveform generated after digitization and synthesis in accordance with the process described with respect to FIG. 3. Methods for generating a composite waveform from individual selected waveforms are well-known in the art.

It is noted that the selection of the hardware configuration is preferably determined based on several criteria including, but not limited to, favored processing speed and the possible measurement of a single-shot or short burst, which needs synchronized parallel detection.

The foregoing disclosure of the preferred embodiments of the present invention has been presented for purposes of illustration and description. It is not intended to be exhaustive or to limit the invention to the precise forms disclosed. Many variations and modifications of the embodiments described herein will be apparent to one of ordinary skill in the art in light of the above disclosure. The scope of the invention is to be defined only by the claims appended hereto, and by their equivalents.

Further, in describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

What is claimed is:

1. A system for detecting the ON/OFF ratio of radio frequency signals, comprising:
    means for receiving low band and high band signals from a signal source;
    a first set of components including a linear detector and a logarithmic detector, said detectors being independently connected to an output of the means for receiving;
    a second set of components including a mixing stage, wherein inputs of said first and second sets of components are coupled to the output of the means for receiving;
    a first routing relay in communication with outputs of the linear detectors and the logarithmic detector to output one of the outputs of the linear detectors and the logarithmic detector;
    a second routing relay in communication with an output of the first routing relay and an output of the second set of components, the second routing relay being in communication with at least one digitizer, wherein the at least one digitizer receives signals processed by at least one of the first set of components and the second set of components; and
    means for constructing a composite waveform from output signals received independently and at different times from the linear detector and the logarithmic detector.

2. The system of claim 1, wherein the means for receiving low band and high band signals comprises at least one mixer, a low pass filter and an amplifier.

3. The system of claim 1, wherein the first set of components further comprises an amplifier connected to the linear detector and an amplifier connected to the logarithmic detector.

4. The system of claim 1, further comprising a third routing relay connected between the second routing relay and the at least one digitizer.

5. The system of claim 1, wherein the means for constructing a composite waveform from output signals received from the linear detector and the logarithmic detector comprises a system that determines low and high transitions of each of the output signals received from the linear detector and the logarithmic detector.

6. The system of claim 1, wherein the means for constructing a composite waveform from output signals received from the linear detector and the logarithmic detector comprises a series of steps performed by a computer.

7. The system of claim 1, wherein a dynamic range of the system is at least about 70 dB.

8. The system of claim 1, wherein the system is integrated into a radio frequency portable field test box.

9. A system for detecting the ON/OFF ratio of radio frequency signals, comprising:
    means for receiving low band and high band signals from a signal source;
    a first set of components including a linear detector and a logarithmic detector, said detectors being independently connected to an output of the means for receiving;
    a second set of components including a mixing stage, wherein inputs of said first and second sets set of components are coupled to the output of the means for receiving;
    a first routing relay in communication with (i) an output of one of the linear detector and the logarithmic detector and (ii) an output of the second set of components, an output of the first routing relay being in communication with an input to a first digitizer; and
    and a second routing relay in communication with (i) an output of the first routing relay and (ii) an output of the other one of the linear detector and the logarithmic detector, the second routing relay being in communication with an input to a second digitizer, wherein the first and second routing relays are configured such that outputs of the linear detector and the logarithmic detector are respectively and simultaneously fed to the inputs of the first and second digitizers; and
    means for constructing a composite waveform from output signals received from the linear detector and the logarithmic detector that are digitized by the first and second digitizers.

10. The system of claim 9, wherein the means for receiving low band and high band signals comprises at least one mixer, a low pass filter and an amplifier.

11. The system of claim 9, wherein the first set of components further comprises an amplifier connected to the linear detector and an amplifier connected to the logarithmic detector.

12. The system of claim 9, further comprising a third routing relay connected between the first and second routing relays.

13. The system of claim 9, wherein the means for constructing a composite waveform from output signals received from the linear detector and the logarithmic detector comprises a system that determines low and high transitions of each of the output signals received from the linear detector and the logarithmic detector.

14. The system of claim 9, wherein the means for constructing a composite waveform from output signals received from the linear detector and the logarithmic detector comprises a series of steps performed by a computer.

15. The system of claim 9, wherein a dynamic range of the system is at least about 70 dB.

16. The system of claim 9, wherein the system is integrated into a radio frequency portable field test box.

17. A method of capturing and displaying the ON/OFF ratio of an RF signal, comprising:
    applying the RF signal to both a linear detector and a logarithmic detector;
    applying an output signal of the linear detector to a first routing relay;
    applying an output signal of the logarithmic detector to a second routing relay;
    digitizing the output signals of the linear detector and the logarithmic detector that have passed through the first and second routing relays;
    determining low and high transitions for the digitized output signals; and
    constructing a composite waveform from the digitized output signals by determining low and high transitions of the digitized output signals and displaying the composite waveform.

18. The method of claim 17, wherein an achieved dynamic range is at least about 70 dB.

19. The method of claim 17, further comprising performing the steps of determining and constructing on a computer.

20. The method of claim 17, further comprising converting the digitized output to decibels.

21. The method of claim 17, further comprising configuring the first and second routing relays such that the output signals of the linear and logarithmic detectors are respectively applied, simultaneously, to inputs of digitizers.

22. The method of claim 17, further comprising applying an output of the first routing relay to a third routing relay that is in communication with the second routing relay.

* * * * *